(12) United States Patent
Goldwitz

(10) Patent No.: US 10,889,247 B2
(45) Date of Patent: Jan. 12, 2021

(54) TRUCK STORAGE APPARATUS

(71) Applicant: Brian Goldwitz, Orange, CT (US)

(72) Inventor: Brian Goldwitz, Orange, CT (US)

( * ) Notice: Subject to any disclaimer, the term of this patent is extended or adjusted under 35 U.S.C. 154(b) by 0 days.

(21) Appl. No.: 16/691,492

(22) Filed: Nov. 21, 2019

(65) Prior Publication Data

US 2020/0086797 A1 Mar. 19, 2020

Related U.S. Application Data

(62) Division of application No. 15/823,536, filed on Nov. 27, 2017, now abandoned.

(60) Provisional application No. 62/427,106, filed on Nov. 28, 2016.

(51) Int. Cl.
| | |
|---|---|
| *B60R 5/04* | (2006.01) |
| *B60R 9/06* | (2006.01) |
| *B60P 1/64* | (2006.01) |
| *B65F 1/00* | (2006.01) |

(52) U.S. Cl.
CPC ............ *B60R 5/045* (2013.01); *B60P 1/6418* (2013.01); *B60R 9/06* (2013.01); *B60R 9/065* (2013.01); *B65F 1/0073* (2013.01)

(58) Field of Classification Search
CPC ....... B65D 7/26; B65D 11/1833; B60R 5/045; B60R 2011/0082; B60R 9/065; B60R 9/06; B60P 1/6418; B65F 1/0073
USPC .......................................................... 224/404
See application file for complete search history.

(56) References Cited

U.S. PATENT DOCUMENTS

| | | | | |
|---|---|---|---|---|
| 489,711 | A * | 1/1893 | Mandioni ................ | B65D 7/26 220/6 |
| 1,194,570 | A * | 8/1916 | Stuart ..................... | B65D 7/26 220/6 |
| 1,354,928 | A | 10/1920 | Watson | |
| 1,673,769 | A * | 6/1928 | Graham ................. | G07C 13/02 220/6 |
| 1,941,860 | A * | 1/1934 | Hanson ................... | B60R 5/041 224/498 |

(Continued)

FOREIGN PATENT DOCUMENTS

| | | |
|---|---|---|
| CA | 2720769 A1 | 1/2011 |
| CA | 2700005 A1 | 10/2011 |
| RU | 161264 U1 | 4/2016 |

OTHER PUBLICATIONS

PCT/US2017/063339. International Search Report & Written Opinion (dated Mar. 29, 2018).

*Primary Examiner* — Adam J Waggenspack
(74) *Attorney, Agent, or Firm* — Tyler Barrett; Loza & Loza, LLP

(57) ABSTRACT

Truck storage devices are adapted to convert between a storage configuration and a folded configuration. According to one example, a truck storage device may include a bottom panel with four edges forming a rectangle. The bottom panel may be movably coupled to a lower section of a back panel along a first edge of the bottom panel, a front panel along a second edge of the bottom panel opposite from the first edge, a first side panel along a third edge of the bottom panel, and a second side panel along a fourth edge of the bottom panel opposite from the third edge. A top panel may be movably coupled to an upper section of the back panel, where the upper section of the back panel is movably coupled to the lower section of the back panel. Other aspects, embodiments, and features are also included.

12 Claims, 9 Drawing Sheets

(56) References Cited

U.S. PATENT DOCUMENTS

| | | | | |
|---|---|---|---|---|
| 2,221,504 A | * | 11/1940 | Beasley | B65D 43/14 |
| | | | | 220/6 |
| 3,130,850 A | | 4/1964 | Oakey et al. | |
| 3,611,994 A | * | 10/1971 | Bailey | A01K 1/0245 |
| | | | | 119/496 |
| 4,062,467 A | * | 12/1977 | Friedrich | B65D 7/26 |
| | | | | 220/7 |
| 6,015,056 A | * | 1/2000 | Overholt | B65D 11/1833 |
| | | | | 220/6 |
| 6,401,995 B1 | | 6/2002 | Yuille et al. | |
| 6,918,502 B1 | * | 7/2005 | Overholt | A45C 7/0036 |
| | | | | 220/6 |
| 7,028,834 B2 | | 4/2006 | Karpel | |
| 7,234,618 B2 | | 6/2007 | Warganich | |
| 2006/0266778 A1 | * | 11/2006 | Allotey | B60R 9/00 |
| | | | | 224/403 |
| 2008/0277402 A1 | * | 11/2008 | Lowrey | B25H 3/02 |
| | | | | 220/666 |
| 2010/0264180 A1 | | 10/2010 | Allotey | |
| 2011/0185645 A1 | | 8/2011 | Minko | |
| 2014/0175137 A1 | * | 6/2014 | Roach | B60P 7/0892 |
| | | | | 224/404 |
| 2014/0326764 A1 | * | 11/2014 | Roach | B60R 9/065 |
| | | | | 224/404 |

\* cited by examiner

TRUCK STORAGE APPARATUS

PRIORITY CLAIM

The present Application for Patent is a divisional application of U.S. patent application Ser. No. 15/823,536 entitled "Truck Storage Apparatus" and filed Nov. 27, 2017, which claims priority to Provisional Application No. 62/427,106 entitled "Truck Storage Apparatus" and filed Nov. 28, 2016, the entire disclosure of each of which are expressly incorporated by reference into the present document as if fully disclosed herein.

TECHNICAL FIELD

The technology discussed below relates generally to automotive features, and more specifically to truck storage containers.

BACKGROUND

Pick-up trucks are one of the most popular and versatile vehicles in use today. Pick-up trucks typically have an enclosed cab and an open cargo bed behind the cab. The open cargo bed allows all types of things to be quickly and easily loaded, carried and unloaded. Since the first truck was made for use by non-commercial applications, there has been a need for a confined storage space. Over the years many variations of storage boxes have been devised. A simple box with a lid attached to the inside of the cargo bed was the beginning, followed by a "tool box" mounted to extend over the sides of the cargo bed from the driver's side to the passenger side. The "tool box" was attached similar to the original design.

All these storage boxes are very useful but they do present the owner a problem while not in use. For example, such storage boxes typically consume 25 to 30 percent of the trucks cargo bed space. As these boxes are often attached in a manner that is not conducive to easy removal, this loss of space has prevented many from purchasing one of these storage boxes.

Aspects of the present disclosure provide storage boxes that can be readily folded out of the way to facilitate use of the cargo bed space when the storage box is not in use.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One or more aspects of the present disclosure include truck storage devices. According to at least one embodiment, a truck storage device may include a bottom panel with four edges forming a rectangle. The bottom panel may be movably coupled to a lower section of a back panel along a first edge of the bottom panel, a front panel along a second edge of the bottom panel opposite from the first edge, a first side panel along a third edge of the bottom panel, and a second side panel along a fourth edge of the bottom panel opposite from the third edge. A top panel may be movably coupled to an upper section of the back panel, where the upper section of the back panel is movably coupled to the lower section of the back panel. The bottom panel, the lower section of the back panel, the upper section of the back panel, the front panel, the first side panel, the second side panel, and the top panel are convertible between a storage configuration and a folded configuration.

Additional embodiments of a truck storage device may include a bottom panel and a back panel including a lower section hingedly coupled to the bottom panel and an upper section hingedly coupled to the lower section. A top panel may be hingedly coupled to the upper section of the back panel. A front panel may be hingedly coupled to the bottom panel. A first side panel may be hingedly coupled to the bottom panel. A second side panel hingedly coupled to the bottom panel. The bottom panel, the lower section of the back panel, the upper section of the back panel, the front panel, the first side panel, the second side panel, and the top panel can be convertible between a storage configuration and a folded configuration.

Yet additional aspects of the present disclosure include methods of using truck storage devices. According to at least one implementation, such methods may include folding a first side panel toward a bottom panel along a hinged connection between the first side panel and the bottom panel. A second side panel may be folded toward the bottom panel along a hinged connection between the second side panel and the bottom panel. A front panel may be folded toward the bottom panel along a hinged connection between the front panel and the bottom panel. The bottom panel with the folded first side panel, folded second side panel, and folded front panel may be folded together with a lower section of a back panel, wherein the lower section of the back panel is coupled to an upper section of the back panel along a hinged connection.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular storage device or truck, but are merely representations employed to describe the present disclosure. Additionally, elements common between figures may retain the same numerical designation.

Figure 1:
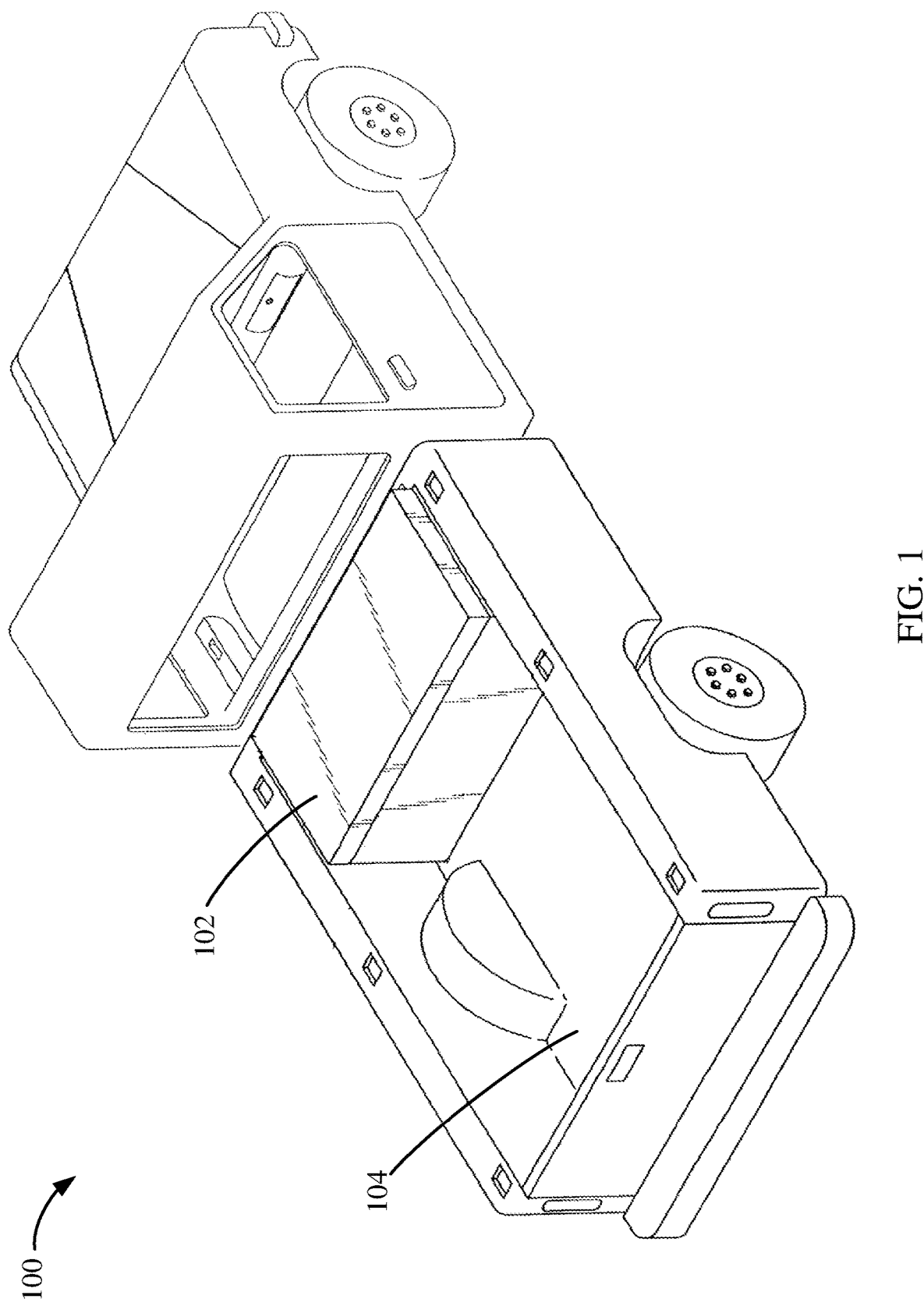
FIG. 1 is a view of a truck with a storage device in a storage configuration according to an embodiment of the present disclosure.

Aspects of the present disclosure relate to foldable storage devices for trucks or other similarly configured vehicles. FIG. 1 is a view of a truck 100 with a storage device 102 positioned on a cargo bed 104 according to an embodiment of the present disclosure. In this illustration, the storage device 102 is open and ready for use to store items therein. As used herein, this configuration with the storage device 102 open and ready for use to store items therein is referred to as the storage configuration. According to aspects of the present disclosure, the storage device 102 may be configured to fold out of the way when not in use. When the storage device 102 is folded out of the way, this configuration may be referred to herein as the folded configuration. In some embodiments, the storage device 102 may be configured to fold up against a wall of the cargo bed area. In other embodiments, the storage device 102 may be configured to fold down onto the floor of the cargo bed 104.

Figure 2:
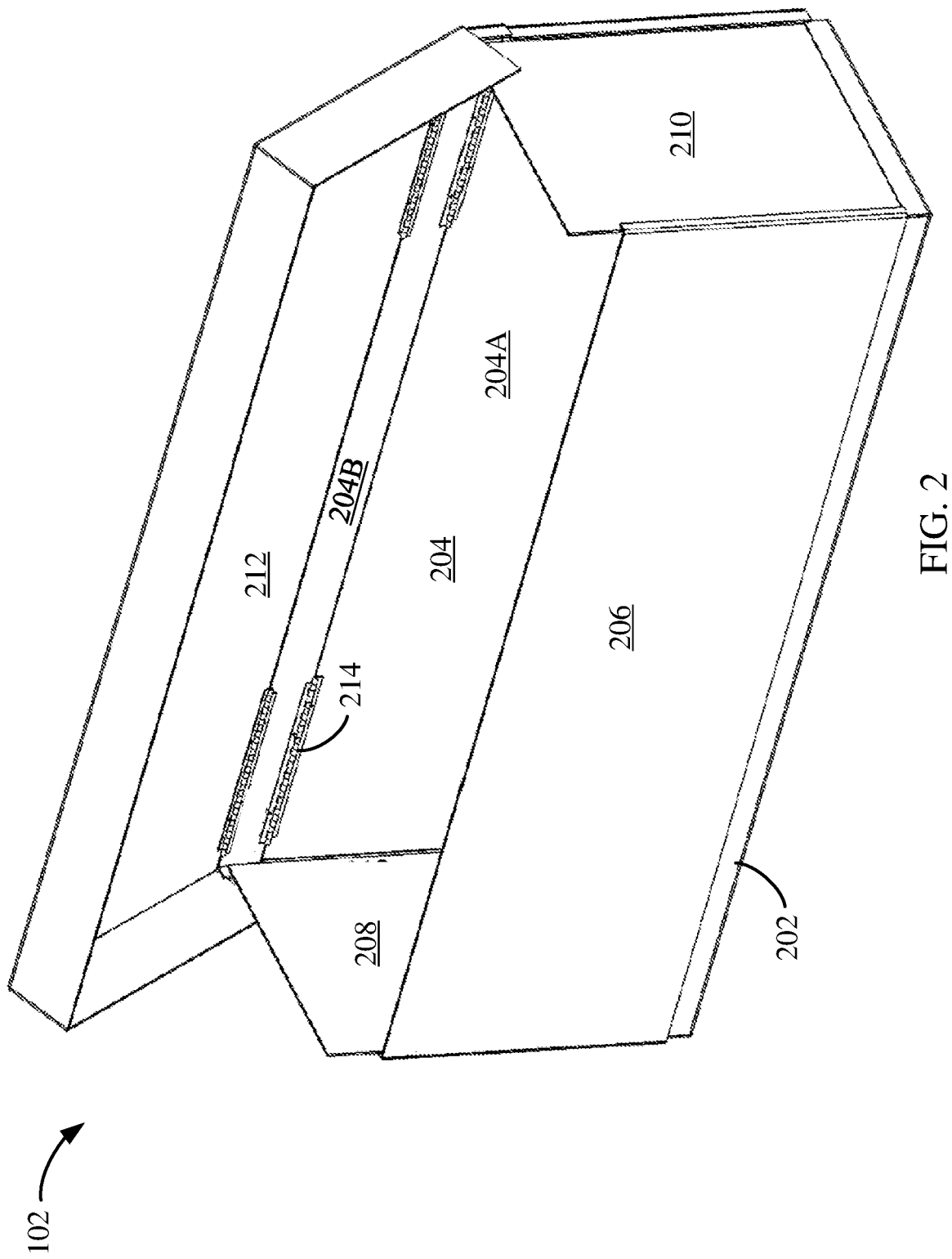
FIG. 2 is an isometric view of a storage device according to one embodiment of the present disclosure.

FIG. 2 illustrates an isometric view of the storage device 102 in the storage configuration according to at least one embodiment. As shown, the storage device 102 generally includes a bottom panel 202 movably coupled to a back panel 204, a front panel 206, a first side panel 208, and a second side panel 210. Further, the back panel 204 is movably coupled to a top panel or lid 212.

The bottom panel 202 may be generally a rectangular shape with four edges. Along a first edge, the bottom panel 202 can be movably coupled to the back panel 204 by a hinge connecting the two panels along an adjoining edge. According to an aspect of the present disclosure, the back panel 204 may include two sections, a lower section 204A and an upper section 204B. The lower section 204A and the upper section 204B can be movably coupled together along a hinged connection 214.

The front panel 206 can also be coupled to the bottom panel 202 with a hinge along another adjoining edge that is opposite from the adjoining edge to which the back panel 204 is coupled. As shown in FIG. 2 with the storage device 102 in the storage configuration, the back panel 204 (including both the lower section 204A and upper section 204B) and the front panel 206 can extend generally parallel to each other, and generally orthogonal to the bottom panel 202.

Further, the first side panel 208 can be coupled to the bottom panel 202 with a hinge along yet another adjoining edge. The second side panel 210 can also be coupled to the bottom panel 202 with a hinge along still another adjoining edge that is located at an opposite side of the rectangular-shaped bottom panel 202 from the adjoining edge to which the first side panel 208 is coupled. As depicted in FIG. 2, the first side panel 208 and the second side panel 210 can extend generally parallel to each other in the storage configuration, and generally transverse to the bottom panel 202, the back panel 204, and the front panel 206 to form a box shaped storage device 102.

The top panel 212 is coupled to the back panel 204 by a hinge along an adjoining edge. More specifically, the top panel 212 is coupled to the upper section 204B of the back panel 204.

Figure 3:
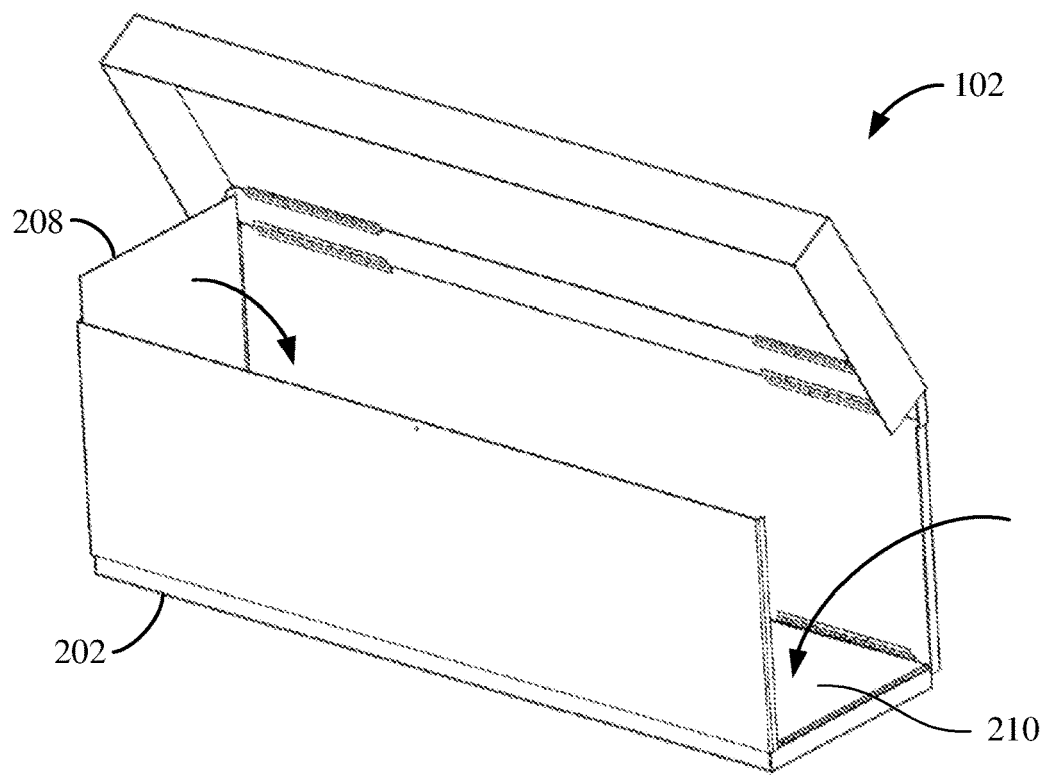
FIG. 3 is an isometric view of a storage device depicting an intermediate stage of converting from a storage configuration to a folded configuration according to at least one embodiment.
Figure 4:
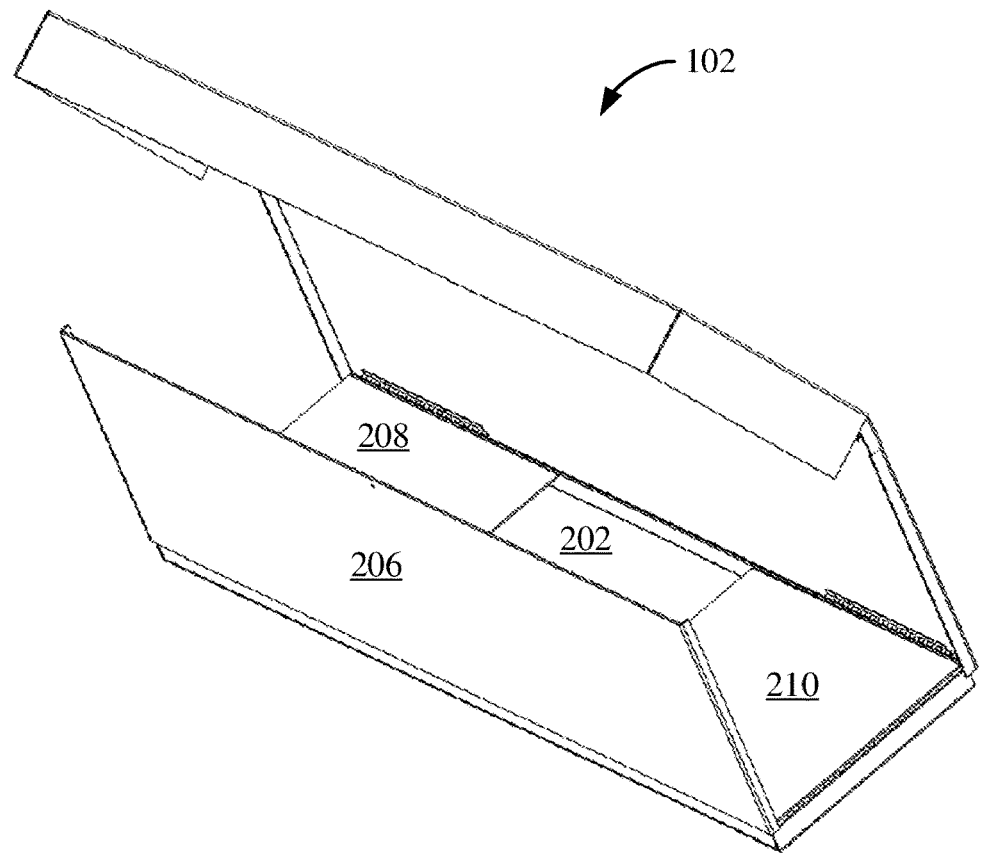
FIG. 4 is an isometric view of a storage device depicting an intermediate stage of converting from a storage configuration to a folded configuration according to at least one embodiment.

According to an aspect of the present disclosure, the various panels are sized and shaped in a manner so that the panels can be folded together into the folded configuration. FIGS. 3 through 8 illustrate an example of converting the storage device 102 from the storage configuration to the folded configuration. As shown in FIG. 3, the first side panel 208 and the second side panel 210 can be folded toward the bottom panel 202 in the direction of the arrows along the hinged connection between the bottom panel 202 and each respective side panel 208, 210. FIG. 4 illustrates the first side panel 208 and the second side panel 210 folded onto the bottom panel 202.

Figure 5:
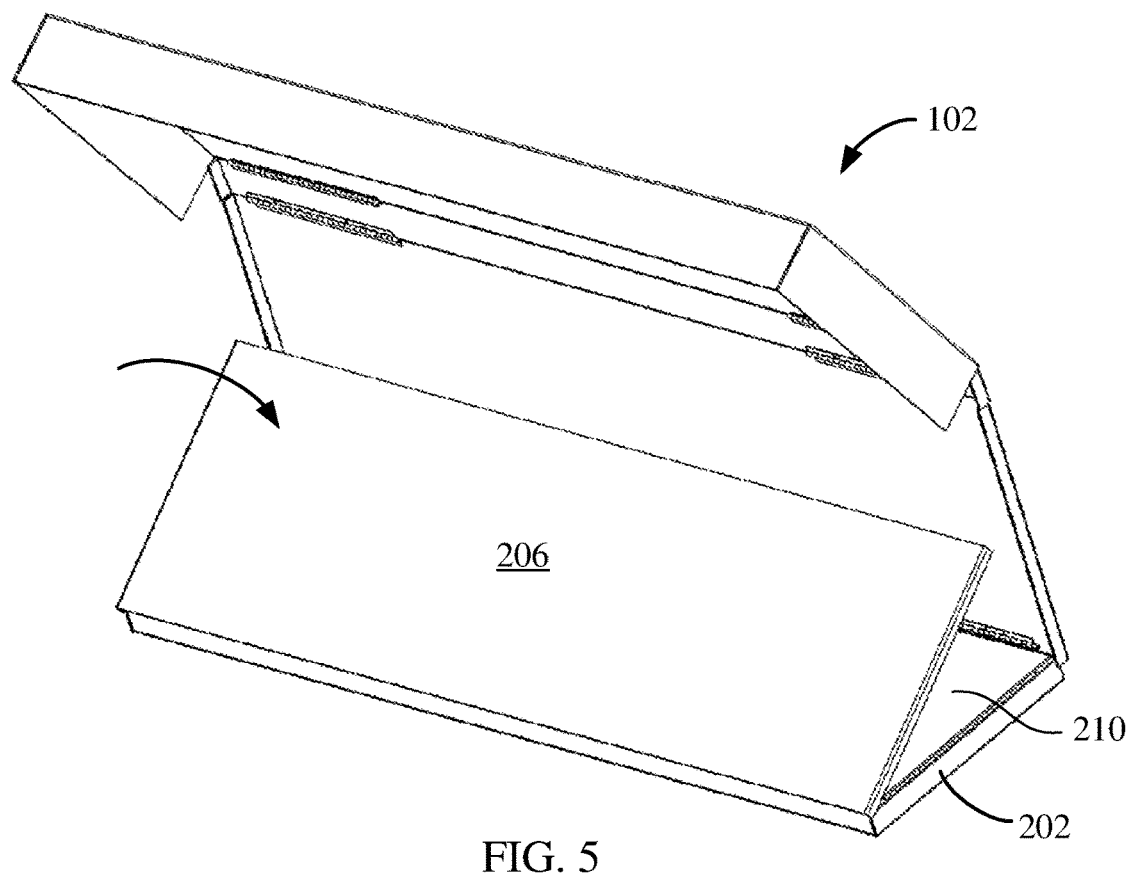
FIG. 5 is an isometric view of a storage device depicting an intermediate stage of converting from a storage configuration to a folded configuration according to at least one embodiment.

As depicted in FIG. 5, the front panel 206 can be folded toward the bottom panel 202 along the hinged connection between the two panels in the direction of the arrow in FIG. 5. In the illustrated example, the first side panel 208 and second side panel 210 are folded onto the bottom panel 202, and the front panel 206 is folded onto the folded first side panel 208 and second side panel 210. In other examples, the front panel 206 may be folded onto the bottom panel 202, and the first side panel 208 and second side panel 210 can be folded onto the folded front panel 206.

With the front panel 206, first side panel 208, and second side panel 210 folded, theses panels, together with the bottom panel 202 can be folded together with at least the lower section 204A of the back panel 204. The particulars for how this fold is performed may depend on the specific embodiment. As noted previously, the storage device 102 in some embodiments may be configured to fold up against a front vertical wall of the cargo bed 104, and an example of folding the storage device 102 for such embodiments will be described with reference to FIGS. 6-8. Further, other embodiments may be configured to fold down onto the floor of the cargo bed 104, and an example of folding the storage device 102 for such embodiments will be described with reference to FIGS. 10-13.

Figure 6:
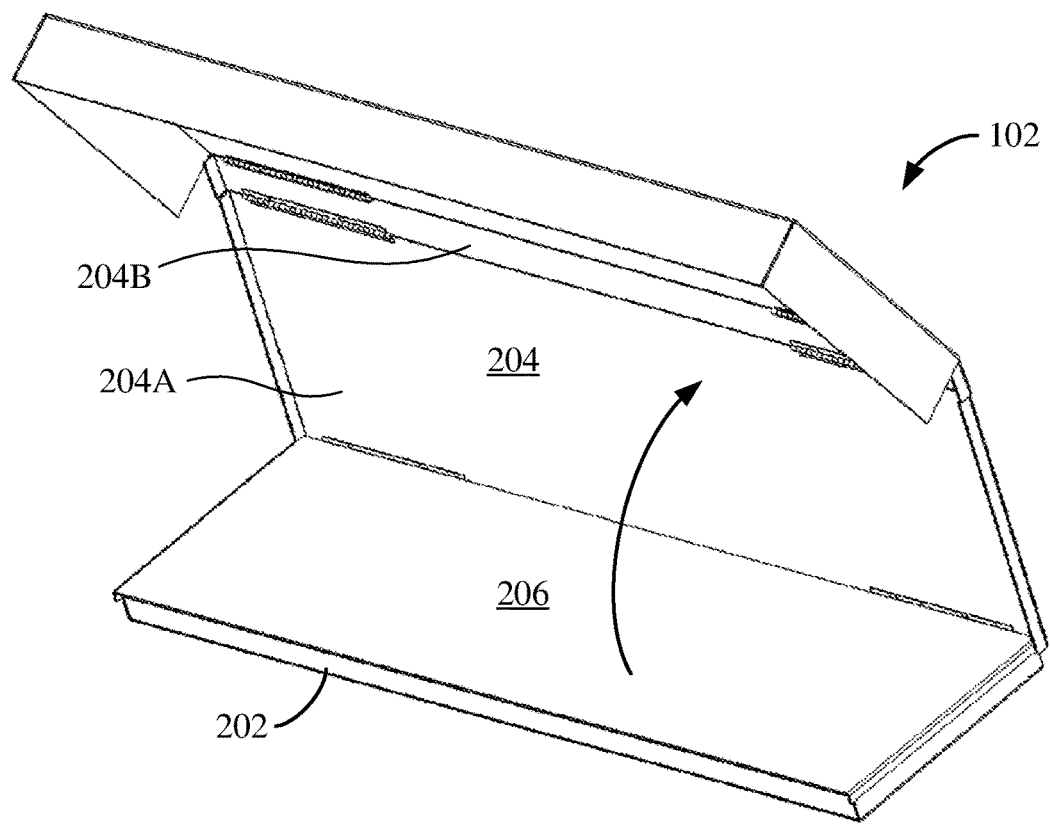
FIG. 6 is an isometric view of a storage device depicting an intermediate stage of converting from a storage configuration to a folded configuration according to at least one embodiment.
Figure 7:
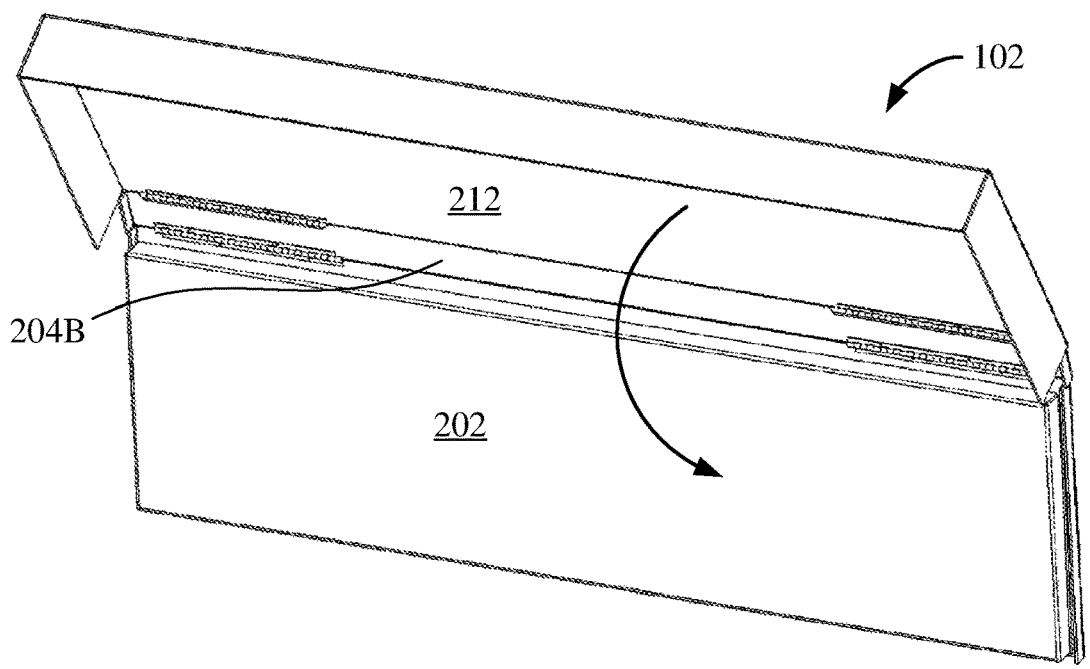
FIG. 7 is an isometric view of a storage device depicting an intermediate stage of converting from a storage configuration to a folded configuration according to at least one embodiment.

Referring to FIG. 6, the storage device 102 may be folded against a front vertical wall of the cargo bed 104 by folding the bottom panel 202, together with the folded first side panel 208, second side panel 210, and front panel 206, up against the lower section 204A of the back panel 204 as depicted by the arrow. In this example, the bottom panel 202 may be sized and shaped to be at least substantially similar to the size and shape of the lower section 204A of the back panel 204, as shown in FIG. 7. With the bottom panel 202 being at least substantially similar in size and shape to the lower section 204A of the back panel 204, the upper section 204B and the top panel 212 can be folded in the direction of the arrow in FIG. 7. Specifically, the upper section 204B can be folded along the hinged connection (e.g., hinged connection 214 in FIG. 2) between the upper section 204B and the lower section 204A, and the top panel 212 can be folded along a hinged connection between the top panel 212 and the upper section 204B of the back panel 204.

Figure 8:
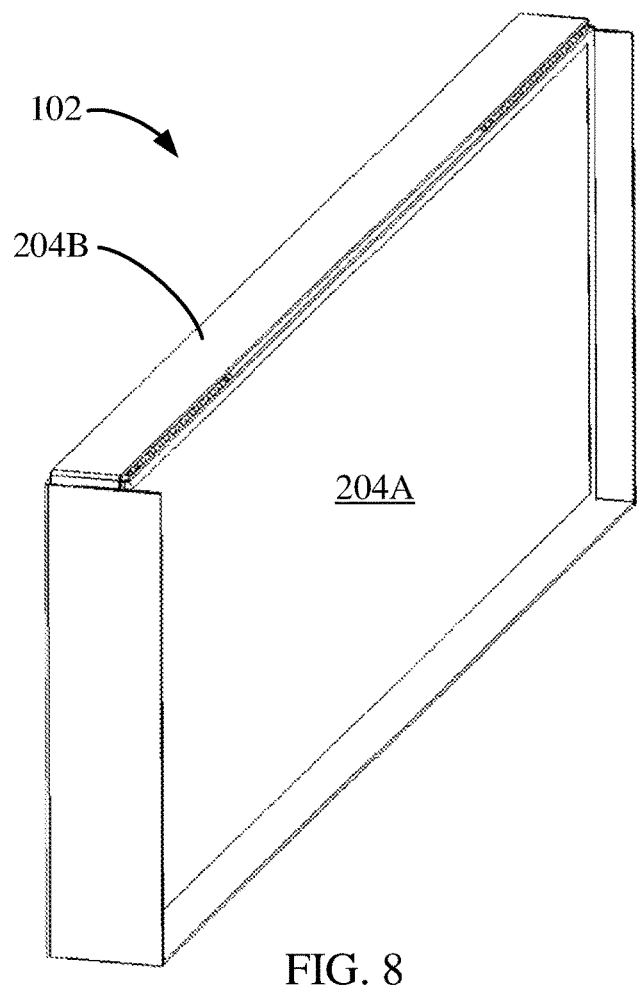
FIG. 8 is an isometric view of a storage device in a folded configuration according to at least one embodiment.

With the top panel 212 folded onto the bottom panel 202, the upper section 204B of the back panel 204 ends up orthogonal or substantially orthogonal to both the top panel 212 and the lower section 204A of the back panel 204, as depicted in FIG. 8. In this embodiment, the upper section 204B of the back panel 204 can facilitate folding the top panel 212 onto the bottom panel 202 by compensating for the thickness of the other panels folded together.

Figure 9:
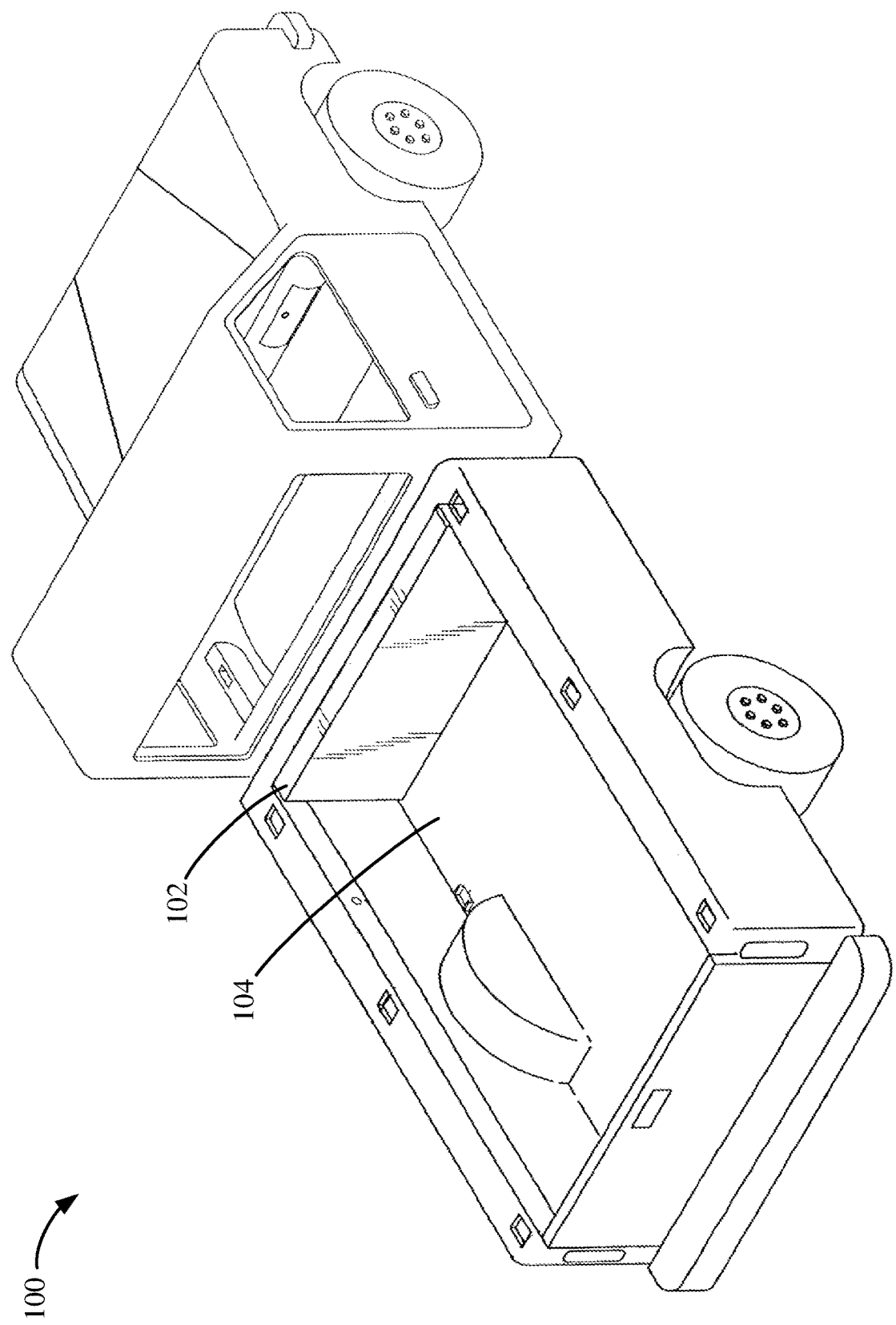
FIG. 9 is a view of the truck from FIG. 1 with the storage device in a folded configuration according to an embodiment of the present disclosure in which the storage device folds toward a front wall of the truck bed.

The folded storage device 102 shown in FIG. 8 can be utilized to open the usable area of the cargo bed 104 of the truck 100 when the storage device 102 is positioned therein. FIG. 9 illustrates the storage device 102 folded up against a front vertical wall of the cargo bed 104. In this example, the lower section 204A of the back panel 204 can be coupled to the front vertical wall in the cargo bed 104 of the truck 100. As shown in FIG. 9, nearly all of the cargo bed 104 can be utilized with the storage device 102 folded up against the front vertical wall of the cargo bed 104. To unfold the storage device 102 to the storage configuration shown in FIG. 1, a user can simply unfold the various panels in an order opposite to the process described above with reference to FIGS. 3-8.

Figure 10:
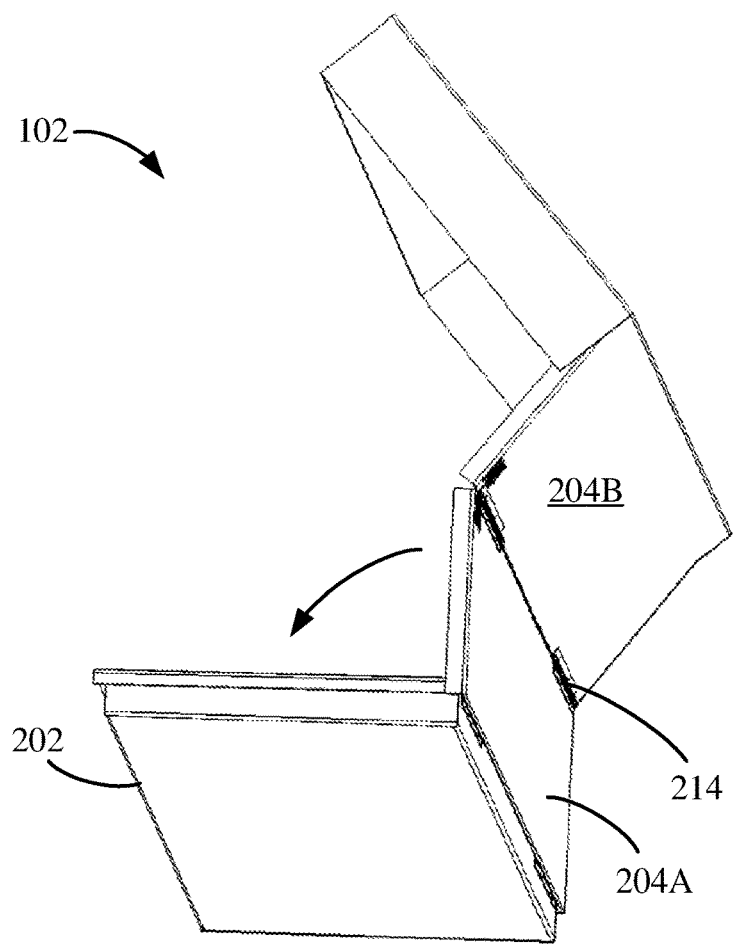
FIG. 10 is an isometric view of a storage device depicting an intermediate stage of converting from a storage configuration to a folded configuration according to at least one embodiment.

Turning now to FIG. 10, an example of folding the storage device 102 onto the floor of the cargo bed 104 will now be described. As noted above, the front panel 206, first side panel 208, and second side panel 210 can be folded as described above with reference to FIGS. 3-5. In this embodiment, the lower section 204A of the back panel 204 can be folded down onto the folded front panel 206, first side panel 208, second side panel 210, and bottom panel 202. For example, the lower section 204A can be folded in the direction of the arrow in FIG. 10 onto the panels as described.

Figure 11:
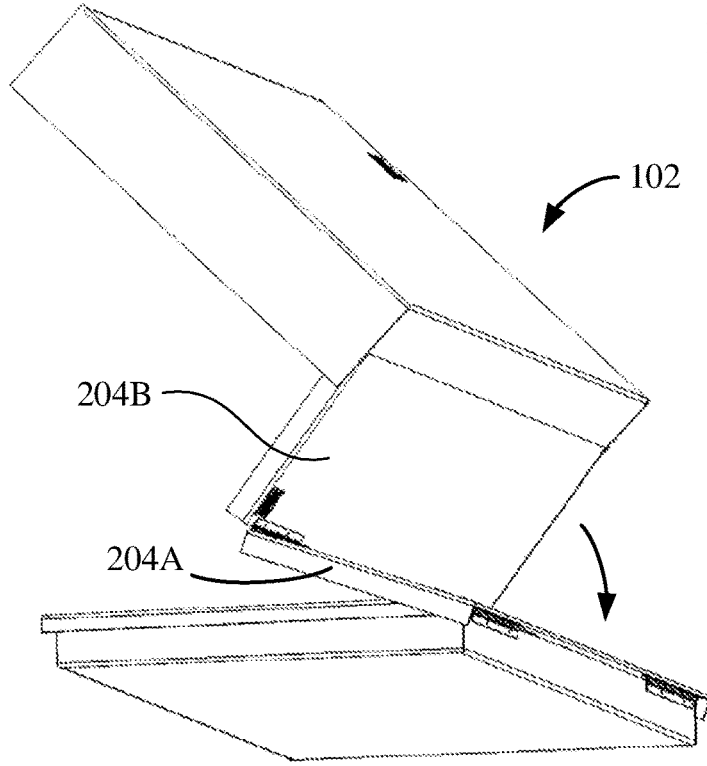
FIG. 11 is an isometric view of a storage device depicting an intermediate stage of converting from a storage configuration to a folded configuration according to at least one embodiment.

Further, with reference to FIG. 11, the upper section 204B of the back panel 204 can be folded onto the lower section 204A of the back panel 204 along the hinged connection 214. In one or more embodiments, the lower section 204A and the upper section 204B can be at least substantially similar in size, such that each makes up about half of the back panel 204. Although the example shows the lower section 204A folded onto the front panel 206, it should be understood that the lower section 204A may be folded onto the first side panel 208 and the second side panel 210. In such examples, the front panel 206 may be folded under the first side panel 208 and second side panel 210, or the front panel 206 may be folded onto the upper section 204B of the back panel 204 after it has been folded.

Figure 12:
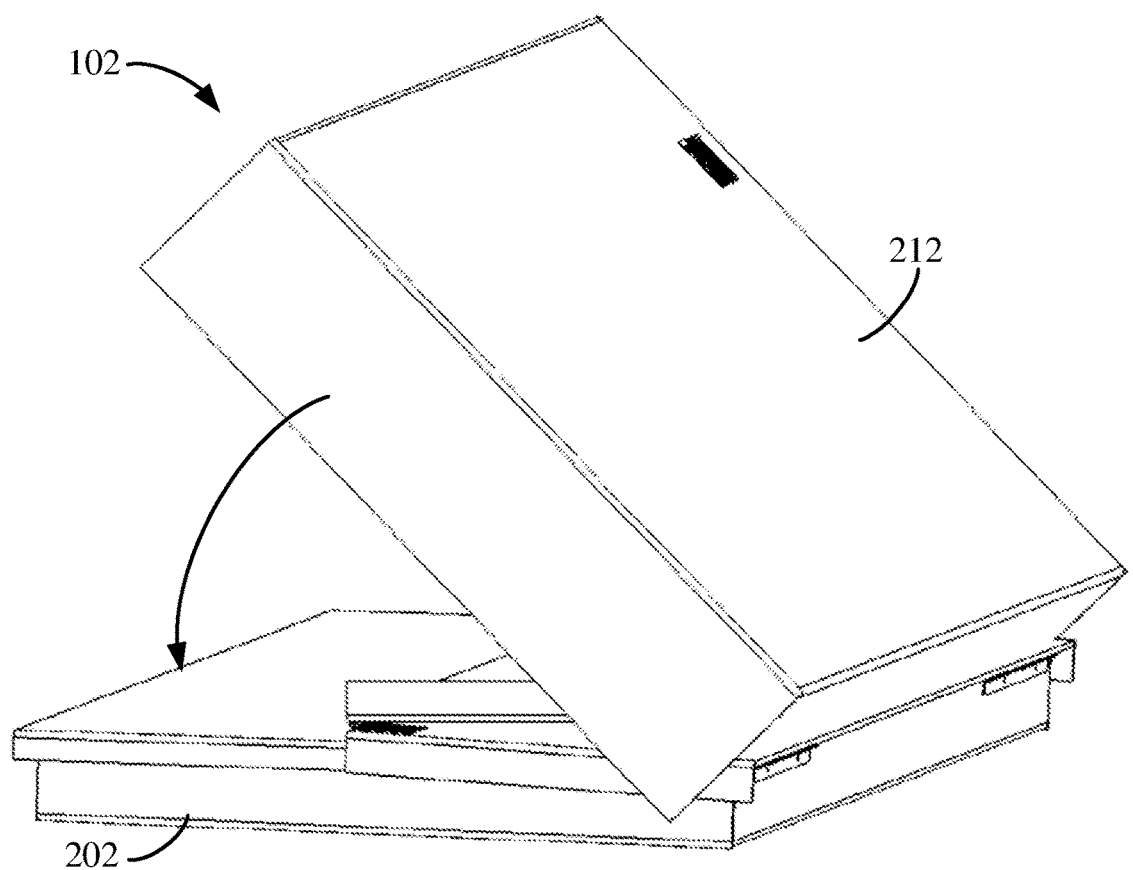
FIG. 12 is an isometric view of a storage device depicting an intermediate stage of converting from a storage configuration to a folded configuration according to at least one embodiment.
Figure 13:
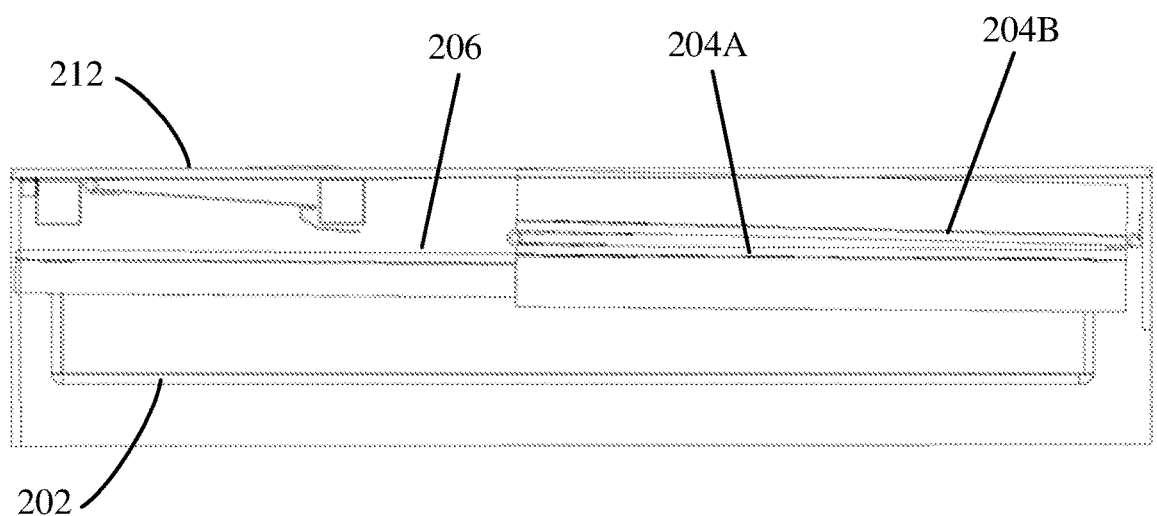
FIG. 13 is a side view of a storage device in a folded configuration according to at least one embodiment.

When the upper section 204B is completely folded onto the lower section 204A, the upper section 204B and lower section 204A may be parallel or substantially parallel to each other, as can be seen in FIG. 12. With the upper section 204B folded onto the lower section 204A, the top panel 212 can be folded down toward the bottom panel 202 along the hinged connection between the top panel 212 and the upper section 204B of the back panel 204 in the direction of the arrow in FIG. 12. When the top panel 212 is folded toward the bottom panel 202, the various other panels are sandwiched between the bottom panel 202 and the top panel 212, as shown in FIG. 13.

Figure 14:
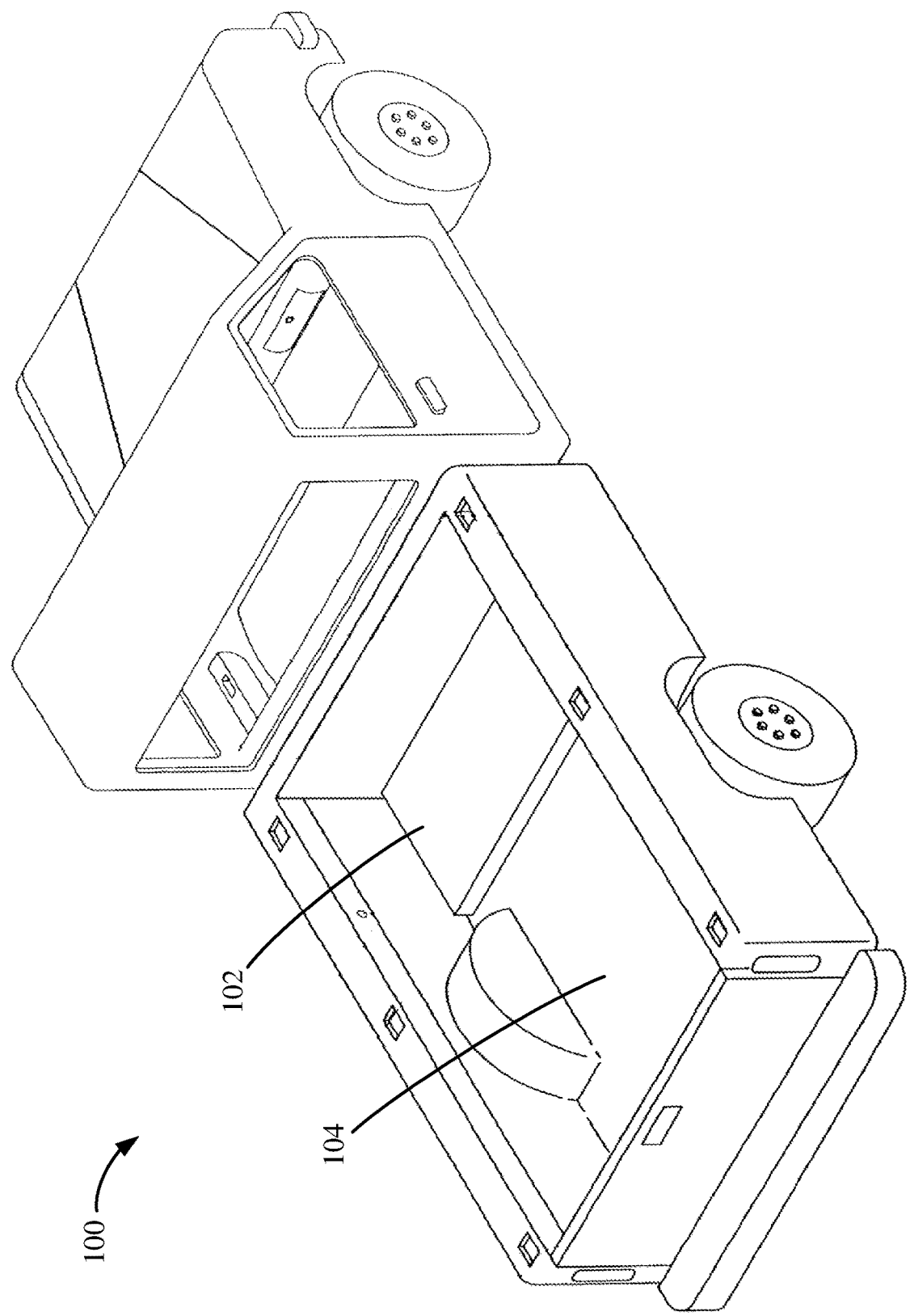
FIG. 14 is a view of the truck from FIG. 1 with the storage device in a folded configuration according to an embodiment of the present disclosure in which the storage device folds down to a floor of the truck bed.

FIG. 14 illustrates the storage device 102 folded up on the floor of the cargo bed 104. In this example, the bottom panel 202 can be coupled to the floor in the cargo bed 104 of the truck 100. As shown in FIG. 14, items can be placed in the cargo bed 104 can be positioned on top of the storage device 102 folded up against floor of the cargo bed 104. To unfold the storage device 102 to the storage configuration shown in FIG. 1, a user can simply unfold the various panels in the opposite process from that described above with reference to FIGS. 3-5 and 10-13.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13, and/or 14 may be rearranged and/or combined into a single component, step, feature or function or embodied in several components, steps, or functions. Additional elements, components, steps, and/or functions may also be added or not utilized without departing from the present disclosure.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A truck storage device, comprising:
   a bottom panel comprising four edges forming a rectangle, the bottom panel movably coupled to
      a lower section of a back panel along a first edge of the bottom panel,
      a front panel along a second edge of the bottom panel opposite from the first edge,
      a first side panel along a third edge of the bottom panel, and
      a second side panel along a fourth edge of the bottom panel opposite from the third edge; and
   a top panel movably coupled to an upper section of the back panel, wherein the upper section of the back panel is movably coupled to the lower section of the back panel;
   wherein the bottom panel, the lower section of the back panel, the upper section of the back panel, the front panel, the first side panel, the second side panel, and the top panel are convertible between a storage configuration and a folded configuration, and wherein the bottom panel is substantially parallel to the lower section of the back panel, the front panel, the first side panel, the second side panel, and the top panel, while being substantially orthogonal to the upper section of the back panel in the folded configuration, and wherein the upper section of the back panel extends beyond both the first side panel and the second side panel, and is in direct contact with a portion of the first side panel and the second side panel in the storage configuration.

2. The truck storage device of claim 1, wherein the bottom panel is substantially orthogonal to the back panel, the front panel, the first side panel, and the second side panel in the storage configuration.

3. A method of using a truck storage device, comprising:
folding a first side panel toward a bottom panel along a hinged connection between the first side panel and the bottom panel;
folding a second side panel toward the bottom panel along a hinged connection between the second side panel and the bottom panel;
folding a front panel toward the bottom panel along a hinged connection between the front panel and the bottom panel; and
folding the bottom panel with the folded first side panel, folded second side panel, and folded front panel together with a lower section of a back panel, wherein the lower section of the back panel is coupled to an upper section of the back panel along a hinged connection;
folding the upper section of the back panel to a position substantially orthogonal to the lower section of the back panel along the hinged connection, wherein the upper section of the back panel extends wider than the bottom panel, the front panel, and the lower section of the back panel; and
folding a top panel toward the bottom panel along a hinged connection between the top panel and the upper section of the back panel, wherein the top panel is substantially orthogonal to the upper section of the back panel.

4. The method of claim 3, wherein:
folding the first side panel toward the bottom panel comprises folding the first side panel onto the bottom panel; and
folding the second side panel toward the bottom panel comprises folding the second side panel onto the bottom panel.

5. The method of claim 4, wherein folding the front panel toward the bottom panel comprises folding the front panel onto the folded first side panel and folded second side panel.

6. The method of claim 3, wherein folding the front panel toward the bottom panel comprises:
folding the front panel onto the bottom panel.

7. The method of claim 3, further comprising:
coupling the back panel to a wall of a truck bed.

8. A truck storage device, comprising:
a bottom panel;
a back panel including a lower section and an upper section hingedly coupled together, the lower section hingedly coupled to the bottom panel;
a top panel hingedly coupled to the upper section of the back panel;
a front panel hingedly coupled to the bottom panel;
a first side panel hingedly coupled to the bottom panel; and
a second side panel hingedly coupled to the bottom panel;
wherein the bottom panel, the lower section of the back panel, the upper section of the back panel, the front panel, the first side panel, the second side panel, and the top panel are convertible between a storage configuration and a folded configuration, and
wherein the bottom panel is substantially parallel to the lower section of the back panel, the front panel, the first side panel, the second side panel, and the top panel, while being substantially orthogonal to the upper section of the back panel in the folded configuration, and
wherein the upper section of the back panel extends beyond both the first side panel and the second side panel, and is in direct contact with a portion of the first side panel and the second side panel in the storage configuration.

9. The truck storage device of claim 8, wherein the bottom panel is orthogonal to the lower section of the back panel, the front panel, the first side panel, and the second side panel in the storage configuration.

10. The truck storage device of claim 9, wherein the upper section of the back panel is parallel to the lower section of the back panel in the storage configuration.

11. The truck storage device of claim 1, wherein the lower section of the back panel extends past the first edge of the bottom panel in the storage configuration.

12. The truck storage device of claim 8, wherein the lower section of the back panel extends past the hingedly coupled portion of the bottom panel in the storage configuration.

* * * * *